United States Patent
Wu et al.

(10) Patent No.: US 10,155,862 B2
(45) Date of Patent: Dec. 18, 2018

(54) THERMOPLASTIC VULCANIZATE INCLUDING RUBBER BLOCK INTERPOLYMER

(71) Applicant: Dow Global Technologies LLC, Midland, MI (US)

(72) Inventors: Xiaosong Wu, Sugar Land, TX (US); Kim L. Walton, Lake Jackson, TX (US); Colin Li Pi Shan, Pearland, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 15/539,003

(22) PCT Filed: Dec. 11, 2015

(86) PCT No.: PCT/US2015/065206
§ 371 (c)(1),
(2) Date: Jun. 22, 2017

(87) PCT Pub. No.: WO2016/105973
PCT Pub. Date: Jun. 30, 2016

(65) Prior Publication Data
US 2018/0037731 A1 Feb. 8, 2018

Related U.S. Application Data

(60) Provisional application No. 62/096,024, filed on Dec. 23, 2014.

(51) Int. Cl.
| C08F 297/08 | (2006.01) |
| C08L 53/00 | (2006.01) |
| C08L 23/16 | (2006.01) |
| C08L 23/12 | (2006.01) |

(52) U.S. Cl.
CPC ............ C08L 53/00 (2013.01); C08F 297/08 (2013.01); C08F 297/086 (2013.01); C08L 23/16 (2013.01); C08L 23/12 (2013.01)

(58) Field of Classification Search
CPC ............................ C08L 53/00; C08F 297/086
See application file for complete search history.

(56) References Cited

U.S. PATENT DOCUMENTS

| 6,121,383 | A | 9/2000 | Abdou-Sabet et al. |
| 6,268,444 | B1 | 7/2001 | Klosin et al. |
| 6,297,301 | B1 | 10/2001 | Erderly et al. |
| 6,395,671 | B2 | 5/2002 | LaPointe |
| 7,579,408 | B2 | 8/2009 | Walton et al. |
| 8,476,366 | B2 | 7/2013 | Walton et al. |
| 8,486,878 | B2 | 7/2013 | Li Pi Shan et al. |
| 8,569,422 | B2 | 10/2013 | Shan et al. |
| 2003/0004286 | A1 | 1/2003 | Klosin et al. |
| 2004/0010103 | A1 | 1/2004 | Boussie et al. |
| 2006/0199910 | A1* | 9/2006 | Walton .................... C08L 23/06 525/192 |
| 2007/0129493 | A1 | 6/2007 | Sahnoune et al. |
| 2008/0033089 | A1 | 2/2008 | Ellul et al. |
| 2014/0309358 | A1 | 10/2014 | Jacob et al. |
| 2017/0369691 | A1 | 12/2017 | Wu et al. |

FOREIGN PATENT DOCUMENTS

| WO | 003/040195 | 5/2003 |
| WO | 004/024740 | 3/2004 |
| WO | 2007/035485 A1 | 3/2007 |

OTHER PUBLICATIONS

PCT/US2015/065206, International Search Report & Written Opinion, dated Mar. 7, 2016.
PCT/ US2015/065206, International Preliminary Report on Patentability, dated Jul. 6, 2017.

* cited by examiner

*Primary Examiner* — Robert D. Harlan

(57) ABSTRACT

A thermoplastic vulcanizate composition includes (a) a crystalline thermoplastic polyolefin comprising alpha-olefin monomers having from 2 to 5 carbon atoms, (b) a rubber block interpolymer comprising a first block and a second block having differing chemical or physical properties from the first block, the first block is derived from ethylene, a first alpha-olefin monomer having from 3 to 10 carbon atoms, and a first diene monomer having from 2 to 25 carbon atoms, the second block is derived from ethylene, a second alpha-olefin monomer having from 3 to 10 carbon atoms, and optionally a second diene monomer having from 2 to 25 carbon atoms, and an amount of the block interpolymer in the composition being greater than an amount of the thermoplastic polyolefin in the composition, and (c) a curative system.

10 Claims, 6 Drawing Sheets

(Left Side Sample)

(Right Side Sample)

(Left Side Sample)

(Right Side Sample)

THERMOPLASTIC VULCANIZATE INCLUDING RUBBER BLOCK INTERPOLYMER

FIELD

Embodiments relate to a rubber block interpolymer that includes at least an ethylene/alpha-olefin block and an ethylene/alpha-olefin/diene block for use in thermoplastic vulcanizates, articles incorporating thereof, and methods of manufacturing thereof.

INTRODUCTION

A thermoplastic vulcanizate (TPV) may include finely-dispersed rubber particles in a thermoplastic matrix. The physical properties of a TPV may be affected by many factors including, e.g., the molecular structure of the rubber phase, the properties of the thermoplastic matrix, cure level, and/or the presence of fillers. A TPV composition that includes a vulcanizable elastomer (rubber), a thermoplastic polyolefin, and a block copolymer having a "soft" segment and a "hard" segment to enhance properties thereof is discussed in, e.g., U.S. Pat. No. 8,476,366. However, a need exists to be able to utilize a combination of a block copolymer (and the enhanced properties associated therewith) and a diene (and the properties associated therewith) to act similar to a vulcanizable rubber for the rubber phase in a TPV composition and to enhance cross-linking of the rubber phase and provide better oil retention capability.

SUMMARY

Embodiments may be realized by providing a thermoplastic vulcanizate composition that includes (a) a crystalline thermoplastic polyolefin comprising alpha-olefin monomers having from 2 to 5 carbon atoms, (b) a rubber block interpolymer comprising a first block and a second block having differing chemical or physical properties from the first block, the first block is derived from ethylene, a first alpha-olefin monomer having from 3 to 10 carbon atoms, and a first diene monomer having from 2 to 25 carbon atoms, the second block is derived from ethylene, a second alpha-olefin monomer having from 3 to 10 carbon atoms, and optionally a second diene monomer having from 2 to 25 carbon atoms, and an amount of the block interpolymer in the composition being greater than an amount of the thermoplastic polyolefin in the composition, and (c) a curative system.

DETAILED DESCRIPTION

Figure 1:
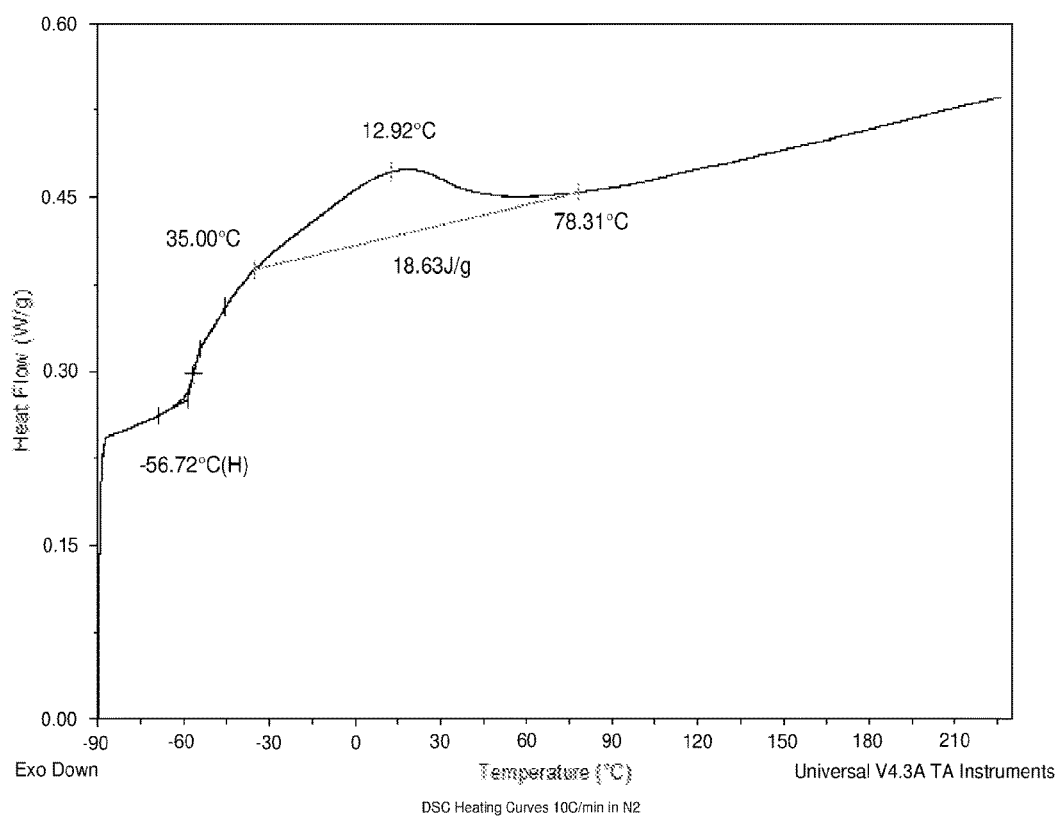
FIG. 1 illustrates a DSC melting point temperature profile of a Block Interpolymer used in Working Examples 1 and 2.

Embodiments relate to a rubber block copolymer/interpolymer (copolymer and interpolymer used interchangeably herein) for use as a vulcanizable elastomer/vulcanizable rubber in thermoplastic vulcanizates (TPV), whereas the molecular structure of two different phases are incorporated into the block interpolymer. In a TPV composition, the vulcanizable elastomer can be cross-linked (i.e., vulcanized) with a thermoplastic polyolefin in the presence of curative system (e.g., cross-linking agent that is part of the curative system). The vulcanizable elastomer may be classified as thermoset because it can undergo an irreversible process of thermosetting. In addition to the rubber block interpolymer, the TPV composition includes at least a thermoplastic polyolefin and a curative system, whereas the amount of the block interpolymer is greater than an amount of the thermoplastic polyolefin in the TPV composition.

With respect to the rubber block interpolymer, by two different phases, it is meant that the block interpolymer includes at least a first block and a second block having differing chemical or physical properties from the first block. As used herein, block copolymers comprise sequences ("blocks" and "segments") of monomer units, covalently bound to sequences of unlike type. The blocks copolymers may be multi-blocks that are connected in at least one of a variety of ways, such as A-B in a diblock form and A-B-A in a triblock form, etc., where A and B represent different blocks. Each of the blocks in the block copolymers may be described as one of a "hard" segment or a "soft" segment," e.g., as discussed in U.S. Pat. No. 8,569,422. A variety of block copolymer architectures are possible, e.g., examples include covalent bonding of hard plastic blocks (which may be substantially crystalline or glassy) to elastomeric blocks (such as thermoplastic elastomers).

The block copolymer is based on at least two different blocks, one of which is an ethylene/alpha-olefin/optionally diene block and the other an ethylene/alpha-olefin/optionally diene block. The ethylene/alpha-olefin/diene block may be an M-class rubber. M-class refers to a classification according to ASTM D1418 and the M-class distinction includes rubbers having a saturated chain of the polymethylene type. For example, the ethylene/alpha-olefin/diene block (and optionally the ethylene/alpha-olefin/optionally diene block) may include an ethylene-propylene-diene (M-class) rubber, also known as EPDM. The majority of the ethylene/alpha-olefin/diene rubbers that are manufactured, e.g., especially if it is low in crystallinity, can block and mass together and cannot stay in (free flow) pellet form, whereas pellet form is favorable for feeding into a continuous TPV production process. Accordingly, in embodiments, a block copolymer that includes an ethylene/alpha-olefin/diene block combines an amorphous "soft" segment that has a higher average crystallinity and contains semi-crystalline "hard" segments, which enable easy pelletization during production and can be maintained in a (free flow) pellet form. This also enables higher oil holding capability for the easy handling of oil containing block copolymers that are in pellet form.

For example, the TPV composition may include a rubber block copolymer that exhibits excellent oil up-take and retains good processability. Exemplary embodiments include a rubber block copolymer that has oil retention capabilities and less, to little oil bleed in a final TPV article, e.g., especially when exposed to sub-ambient, cold temperatures (such as down to −40° C.).

Terms

"Composition" and like terms mean a mixture or blend of two or more components. For example, one composition is the combination of at least a thermoplastic polyolefin and a block interpolymer.

"Blend", "polymer blend" and like terms mean a blend of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art.

"Polymer" means a compound prepared by polymerizing monomers, whether of the same or a different type. The generic term polymer thus embraces the term homopolymer, usually employed to refer to polymers prepared from only one type of monomer, and the term interpolymer as defined below. It also embraces all forms of interpolymers, e.g., random, block, homogeneous, heterogeneous, etc.

"Interpolymer" and "copolymer" mean a polymer prepared by the polymerization of at least two different types of monomers. These generic terms include both classical copolymers, i.e., polymers prepared from two different types of monomers, and polymers prepared from more than two different types of monomers, e.g., terpolymers, tetrapolymers, etc.

"Ethylene-based polymer" and the like terms mean a polymer that comprises a majority weight percent polymerized ethylene monomer (based on the total weight of polymerizable monomers), and optionally may comprise at least one polymerized comonomer different from ethylene (such as at least one selected from a $C_{3-10}$ α-olefin and a diene) so as to form an ethylene-based interpolymer. For example, when the ethylene-based polymer is a copolymer, the amount of ethylene is greater than 50 wt %, based on the total weight to the copolymer. When the ethylene-based polymer is an ethylene/comonomer/diene interpolymer, the amount of the ethylene is greater than the amount of the comonomer and the amount of the diene. "Units derived from ethylene" and like terms mean the units of a polymer that formed from the polymerization ethylene.

"Alpha-olefin-based polymer" and like terms mean a polymer that comprises a majority weight percent of a polymerized alpha-olefin monomer (based on the total amount of polymerizable monomers), and optionally comprises at least one other polymerized alpha-olefin comonomer that is different from the polymerized alpha-olefin monomer so as to form an alpha-olefin-based interpolymer. By alpha-olefin monomer and comonomer it is meant one of a $C_{3-10}$ α-olefin. "Units derived from α-olefin" and like terms mean the units of a polymer that is formed from the polymerization of α-olefin monomers, in particular at least one of a $C_{3-10}$ α-olefin. For example, the alpha-olefin based polymer may be a propylene based polymer, and optionally comprises at least one comonomer selected from a $C_2$ and $C_{4-10}$ α-olefin.

Rubber Block Interpolymer

The block copolymer is a rubber block interpolymer that includes at least a first block and a second block having differing chemical or physical properties from the first block. The first block is derived from at least ethylene, a first alpha-olefin, and a first diene, and the second block is derived from at least ethylene, a second alpha-olefin, and optionally a second diene. The terms "block interpolymer", "block copolymer", "pseudo-block copolymer", "pseudo-block interpolymer", "segmented copolymer", and "segmented interpolymer" refer to a block polymer comprising two or more chemically distinct regions (referred to as "blocks" or "segments") joined in a linear manner, that is, a polymer comprising chemically differentiated units which are joined (covalently bonded) end-to-end with respect to polymerized functionality, rather than in pendent or grafted fashion. The block copolymers may be linear multi-blocks (such as diblocks) or multi-block star copolymers (in which all blocks bond to the same atom or chemical moiety), whereas adjacent differentiated polymer units are joined end-to-end (e.g., covalently bonded in an end-to-end fashion). The blocks differ in the amount or type of comonomer incorporated therein, the density, the amount of crystallinity, the type of crystallinity (e.g. polyethylene versus polypropylene), the crystallite size attributable to a polymer of such composition, the type or degree of tacticity (isotactic or syndiotactic), regio-regularity or regio-irregularity, the amount of branching, including long chain branching or hyper-branching, the homogeneity, and/or any other chemical or physical property. The block copolymer may be differentiated from conventional, random copolymers, physical blends of polymers, and block copolymers prepared via sequential monomer addition.

The block copolymers and the pseudo-block copolymers may include "hard" and "soft" segments. The hard segment is derived from at least ethylene, an alpha-olefin, and optionally a diene. "Hard" segments refer to blocks of polymerized units in which ethylene is present in an amount greater than 60 wt % and up to 95 wt % (e.g., from 70 wt % to 85 wt %), based on the total weight of the polymer. The soft segment is derived from at least ethylene, an alpha-olefin, and optionally a diene. "Soft" segments refer to blocks of polymerized units in which the comonomer, i.e., the alpha-olefin, is present in an amount from 40 wt % to 80 wt % (e.g., from 45 wt % to 70 wt %), based on the total weight of the polymer. Block copolymers containing low crystallinity hard blocks are polymers that have hard blocks that have melting points that are less than 100° C. Applications for such block copolymers include TPV formulations, rubbers, and elastomer cross-linking agents.

With respect to the optional diene, when included the diene may be present in an amount from 0.1 wt % to 10.0 wt % (e.g., 0.1 wt % to 5.0 wt %, 0.1 wt % to 3.0 wt %, 0.1 wt % to 2.0 wt %, 0.1 wt % to 1.0 wt %, and/or 0.1 wt % to 0.8 wt %), based on the total weight of the corresponding block. The diene is present in the hard segments, the soft segments, or both the hard segments and the soft segments. For example, the diene may be present in the soft segments or the hard segments in an amount less than 1 wt % of the total weight of the soft segments or hard segments, respectively. The diene may be present in both the soft segments and the hard segments in an amount less than 1 wt % of the total weight of the soft segments and the hard segments.

The soft segments may be present in the block interpolymer from approximately 1 wt % to 99 wt % of the total weight of the block interpolymer. For example, the soft segments may be present in an amount from 5 wt % to 95 wt %, from 10 wt % to 90 wt %, from 15 wt % to 85 wt %, from 20 wt % to 80 wt %, from 25 wt % to 75 wt %, from 30 wt % to 70 wt %, from 35 wt % to 65 wt %, from 40 wt % to 60 wt %, and/or from 45 wt % to 55 wt % of the total weight of the block interpolymer. The hard segments may be present in similar ranges, e.g., so as to account for a remainder with respect to the total segments in the block interpolymer. In the block interpolymers, all blocks are characterized as one of a hard segment or a soft segment, based on the total ethylene and/or alpha-olefin content in the block. The polymer is said to have a hard segment majority when the amount of hard segments present is greater than the amount of the soft segments present. The soft segment weight percentage and the hard segment weight percentage can be calculated based on data obtained from DSC or NMR. Such methods and calculations are disclosed in, e.g., U.S. Pat. No. 8,486,878.

The first block may be an ethylene/alpha-olefin/diene block and optionally the second block may be an ethylene/alpha-olefin/diene block, whereas the first block and optionally the second block can be characterized as an M-class rubber. The alpha-olefin monomer may have from 3 to 10 carbon atoms (i.e., is a $C_3$ to $C_{10}$ olefin). Examples include propylene, isobutylene, 1-butene, 1-pentene, 1-hexane, 1-octene, 2-ethyl-1-hexene, and 1-dodecene. The $C_3$-$C_{10}$ olefins encompass aliphatic and aromatic compounds containing vinylic unsaturation, as well as cyclic compounds, such as cyclobutene, cyclopentene, dicyclopentadiene, and norbornene, including but not limited to, norbornene substituted with hydrocarbyl or cyclohydrocarbyl groups.

The diene monomer may have from 2 to 25 carbon atoms (i.e., is a $C_2$ to $C_{25}$ diene), from 2 to 20 carbon atoms (i.e., is a $C_2$ to $C_{20}$ diene), 5 to 15 carbon atoms (i.e., is a $C_5$ to $C_{15}$ diene), and/or 8 to 12 carbon atoms (i.e., is a $C_8$ to $C_{12}$ diene). Exemplary dienes include isoprene, butadiene, chloroprene ethylidene norbornene, dicyclopentadiene,1,4-hexadiene, 1,4-pentadiene, 1,5-hexadiene, 2,5-dimethyl-1,5-hexadiene, 1,4-octadiene, cyclopentadiene, cyclohexadiene, cyclooctadiene, dicyclopentadiene, 1-vinyl-1-cyclopentene, 1-vinyl-1-cyclohexene, 3-methyl-bicyclo (4,2,1) nona-3,7-diene, 3-ethylbicyclonondiene, methyl tetrahydroindene, 5-ethylidene-2-norbornene, 5-butylidene-2-norbornene, 2-methallyl-5-norbornene, 2-isopropenyl-5-norbornene, 5-(1,5-hexadienyl)-2-norbornene, 5-(3,7-octadieneyl)-2-norbornene, and 3-methyl-tricyclo-(5,2,1,0.sup.2,6)-3,8-decadiene. An exemplary, ethylene/polyolefin/diene is an ethylene-propylene-diene (M-class) rubber, also known as EPDM. The dienes used to prepare EPDMs, include 1,4-hexadiene (HD), 5-ethylidene-2-norbornene (ENB), 5-vinylidene-2-norbornene (VNB), 5-methylene-2-norbornene (MNB), and dicyclopentadiene (DCPD).

The block interpolymers include alternating blocks containing differing (i.e., greater or lesser) quantities of the diene (including none) and alpha-olefin. By use of the block interpolymer, the total quantity of diene and alpha-olefin may be reduced without loss of subsequent polymer properties. That is, the diene and alpha-olefin monomers are preferentially incorporated into a block of the polymer rather than uniformly or randomly throughout a polymer, they are more efficiently utilized and subsequently the crosslink density of the block interpolymer may be better controlled. Such crosslinkable elastomers and the cured products have advantaged properties, e.g., relatively higher tensile strength and better elastic recovery.

The first block, i.e., the ethylene/alpha-olefin/diene block, may be a hard segment (i.e., ethylene is present in an amount greater than 60 wt % and up to 95 wt %) or a soft segment (i.e., the alpha-olefin is present in an amount from 40 wt % to 80 wt %). For example, the first blocks may be hard segments with ethylene in an amount greater than 60 wt % and up to 95 wt %, a diene content from 0.1 wt % to 10.0 wt % (e.g., 0.1 wt % to 5.0 wt %, 0.1 wt % to 2.5 wt %, and/or 0.1 wt % to 1.0 wt %), and a remainder of the alpha-olefin, based on the total weight of the first blocks. The first blocks may be soft segments with the alpha-olefin in an amount from 40 wt % to 80 wt % (e.g., 40 wt % to 70 wt %, 45 wt % to 65 wt %, and/or 45 wt % to 55 wt %), a diene content from 0.1 wt % to 10.0 wt % (e.g., 0.1 wt % to 5.0 wt %, 0.1 wt % to 2.5 wt %, and/or 0.1 wt % to 1.0 wt %), and a remainder of ethylene, based on the total weight of the first blocks. The ethylene/alpha-olefin/diene block may be consider an ethylene based polymer block or an alpha-olefin based polymer block, based on the amount of the ethylene relative to the alpha-olefin therein.

The second block, i.e., the ethylene/alpha-olefin/optionally diene block, may be a hard segment (i.e., ethylene is present in an amount greater than 60 wt % and up to 95 wt %) or a soft segment (i.e., the alpha-olefin is present in an amount from 40 wt % to 80 wt %). For example, the second blocks may be hard segments with ethylene in an amount greater than 60 wt % and up to 95 wt %, an optional diene content from 0.1 wt % to 10.0 wt % (e.g., 0.1 wt % to 5.0 wt %, 0.1 wt % to 2.5 wt %, and/or 0.1 wt % to 1.0 wt %), and a remainder of the alpha-olefin, based on the total weight of the second blocks. The second blocks may be soft segments with the alpha-olefin in an amount from 40 wt % to 80 wt %, an optional diene content from 0.1 wt % to 10.0 wt % (e.g., 0.1 wt % to 5.0 wt %, 0.1 wt % to 2.5 wt %, and/or 0.1 wt % to 1.0 wt %), and a remainder of ethylene, based on the total weight of the second blocks. The ethylene/alpha-olefin/optionally diene block may be consider an ethylene based polymer block or an alpha-olefin based polymer block, based on the amount of the ethylene relative to the alpha-olefin therein. In exemplary embodiments, the second block may be an ethylene/alpha-olefin block having an ethylene content greater than 60 wt % to 95 wt %, from 65 wt % to 85 wt %, and/or from 65 wt % to 75 wt % (in which case the second block excludes diene).

Comonomer content may be measured using any suitable technique, including techniques based on nuclear magnetic resonance ("NMR") spectroscopy. For polymers or blends of polymers having relatively broad TREF curves, the polymer desirably is first fractionated using TREF into fractions each having an eluted temperature range of 10° C. or less. That is, each eluted fraction has a collection temperature window of 10° C. or less. Using this technique, said block interpolymers have at least one such fraction having a higher molar comonomer content than a corresponding fraction of the comparable interpolymer.

The block interpolymers may be characterized by unique distributions of polymer polydispersity (PDI or Mw/Mn) and block length distribution (e.g., with two or three different block compositions). The block interpolymers may comprise alternating blocks of differing comonomer content (including homopolymer blocks). The block copolymers may contain terminal blocks. For example, based on the effect of the use of one or more shuttling agents in combination with a high activity metal complex based polymerization catalyst in two or more polymerization reactors or zones operating under differing polymerization conditions. The block copolymers may possess a PDI from 1.7 to 3.5 (e.g., from 1.8 to 2.5, from 1.8 to 2.2, and/or from 1.8 to 2.1). The block copolymers may block lengths are a most probable distribution, rather than identical or nearly identical block lengths. The pseudo-block copolymers/block interpolymers may possess a PDI fitting a Schultz-Flory distribution rather than a Poisson distribution, whereas a distribution in block size of polymer blocks of differing density or comonomer content is a Schultz-Flory type of distribution.

For example, the block interpolymers may possess (1) a PDI of at least 1.3, at least 1.5, at least 1.7, at least 2.0, and/or at least 2.4, up to a maximum value of 5.0, 3.5, and/or 2.7; (2) a heat of fusion of 80 J/g or less; (3) an overall ethylene content of at least 50 wt % and/or 60 wt % (e.g., and less than 85 wt %); (4) an overall diene content of less than 10 wt %, less than 5 wt %, and/or less than 1 wt %; (5) a glass transition temperature, Tg, of less than −25° C. and/or less than −30° C.; (6) a Mooney viscosity (ML (1+4) 125° C.) from 1 to 250, from 1 to 200, from 1 to 100, and/or from 20 to 60; and/or (7) one and only one Tm (e.g., see FIG. 1).

The block interpolymers may have a melt index, $I_2$, from 0.01 to 2000 g/10 minutes, from 0.01 to 1000 g/10 minutes, from 0.01 to 500 g/10 minutes, and/or from 0.01 to 100 g/10 minutes. In certain embodiments, the block interpolymers may have a melt index from 0.01 to 10 g/10 minutes, from 0.5 to 50 g/10 minutes, from 1 to 30 g/10 minutes, from 1 to 6 g/10 minutes, and/or from 0.3 to 10 g/10 minutes.

The block interpolymers may have a molecular weight, $M_w$, from 1,000 g/mole to 5,000,000 g/mole, from 1000 g/mole to 1,000,000, from 10,000 g/mole to 500,000 g/mole, from 10,000 g/mole to 300,000 g/mole, and/or from 100,000 g/mol to 200,000 g/mol. The density of the block interpolymers may be from 0.80 to 0.99 g/cm$^3$ and/or from 0.85 g/cm$^3$ to 0.97 g/cm$^3$. For example, the density of the block interpolymers may range from 0.860 to 0.925 g/cm$^3$ or 0.867 to 0.910 g/cm$^3$.

The block interpolymers may have a molecular fraction that elutes between 0° C. and 130° C., when fractionated using Temperature Rising Elution Fractionation ("TREF"), characterized in that said fraction has a molar comonomer content higher (at least 5 percent higher and/or at least 10 percent higher), than that of a comparable random ethylene interpolymer fraction eluting between the same temperatures, whereas the comparable random ethylene interpolymer contains the same comonomer(s), and has a melt index, density, and molar comonomer content (based on the whole polymer) within 10 percent of that of the block interpolymer. For example, the Mw/Mn of the comparable interpolymer may be within 10 percent of that of the block interpolymer and/or the comparable interpolymer having a total comonomer content within 10 weight percent of that of the block interpolymer.

Processes useful for making the block interpolymer are those as described in, e.g., International Publication No. WO 2007/035485. For example, the polymers may be made by a process comprising contacting an addition polymerizable monomer or mixture of monomers under addition polymerization conditions with a composition comprising at least one addition polymerization catalyst, cocatalyst, and chain shuttling agent. The process is characterized by formation of at least some of the growing polymer chains under differentiated process conditions in two or more reactors operating under steady state polymerization conditions or in two or more zones of a reactor operating under plug flow polymerization conditions. Chain terminating agents such as hydrogen may be used if desired to control reactor viscosity or polymer molecular weight.

The block interpolymer described herein is prepared using a method that is distinguishable from anionic polymerization and controlled free radical polymerization. In particular, such methods require sequential monomer addition with polymerization to relative completeness and the types of monomers that can be usefully employed in such methods are limited. For example, in the anionic polymerization of styrene and butadiene to form a SBS type block copolymer, each polymer chain requires a stoichiometric amount of initiator and the resulting polymers have extremely narrow molecular weight distribution, Mw/Mn, preferably from 1.0 to 1.3. That is, the polymer block lengths are substantially identical. Additionally, anionic and free-radical processes are relatively slow, resulting in poor process economics, and not readily adapted to polymerization of α-olefins. In particular, the block copolymer described herein is produced efficiency and catalytically (that is, in a process where more than one polymer molecule is produced for each catalyst or initiator molecule). In certain of these polymers, it is highly desirable that some or all of the polymer blocks comprise amorphous polymers such as a copolymer of ethylene and a comonomer, especially amorphous random copolymers comprising ethylene and an α-olefin (monomer) having 3 or more carbon atoms. Finally, it would be desirable to prepare pseudo-block or block copolymers wherein a substantial fraction of the polymer molecules are of a controlled block number, especially diblocks or triblocks, but wherein the block lengths are a most probable distribution, rather than identical or nearly identical block lengths.

Representative catalysts and chain shuttling agent for forming the block interpolymer are as follows.

Catalyst (A1) is [N-(2,6-di(1-methylethyl)phenyl)amido)(2-isopropylphenyl)(α-naphthalen-2-diyl(6-pyridin-2-diyl)methane)]hafnium dimethyl, prepared according to the teachings of International Publication Nos. WO 2003/040195 and WO 2004/024740.

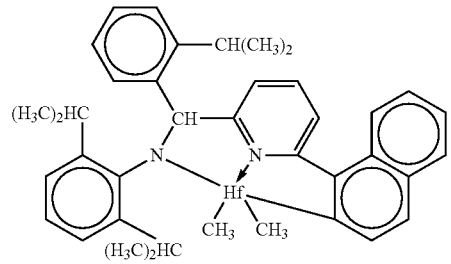

Catalyst (A2) is [N-(2,6-di(1-methylethyl)phenyl)amido)(2-methylphenyl)(1,2-phenylene-(6-pyridin-2-diyl)methane)]hafnium dimethyl, prepared according to the teachings of International Publication Nos. WO 2003/040195 and WO 2004/024740.

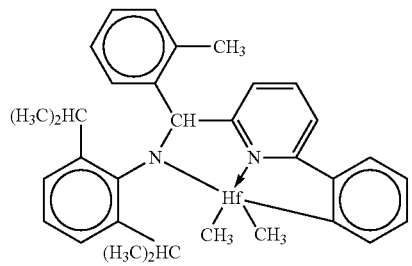

Catalyst (A3) is bis[N,N'''-(2,4,6-tri(methylphenyl)amido)ethylenediamine]hafnium dibenzyl.

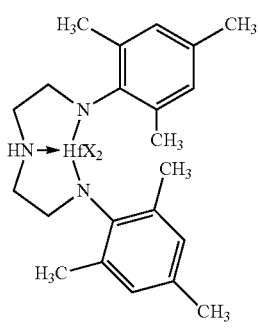

X = CH₂C₆H₅

Catalyst (A4) is bis((2-oxoyl-3-(dibenzo-1H-pyrrole-1-yl)-5-(methyl)phenyl)-2-phenoxymethyl)cyclohexane-1,2-diyl zirconium (IV) dibenzyl, prepared substantially according to the teachings of U.S. Publication No. 2004/0010103.

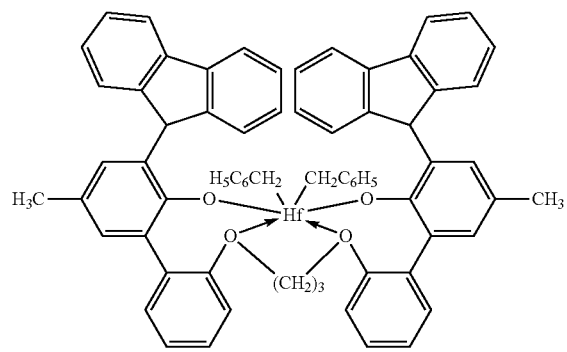

Catalyst (A5) is (bis-(1-methylethyl)(2-oxoyl-3,5-di(t-butyl)phenyl)immino)zirconium dibenzyl.

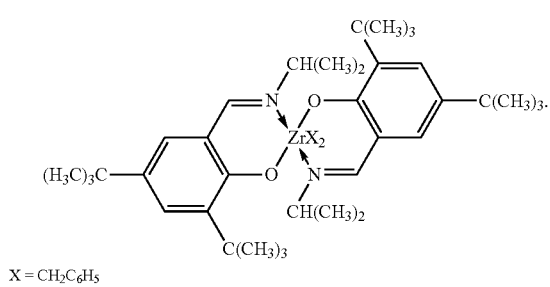

X = CH₂C₆H₅

The preparation of catalyst (A5) is conducted as follows.

a) Preparation of (1-methylethyl)(2-hydroxy-3,5-di(t-butyl)phenyl)imine 3,5-di-t-butylsalicylaldehyde (3.00 g) is added to 10 mL of isopropylamine. The solution rapidly turns bright yellow. After stirring at ambient temperature for 3 hours, volatiles are removed under vacuum to yield a bright yellow, crystalline solid (97 percent yield).

b) Preparation of (bis-(1-methylethyl)(2-oxoyl-3,5-di(t-butyl)phenyl)immino) zirconium Dibenzyl A solution of (1-methylethyl)(2-hydroxy-3,5-di(t-butyl) phenyl)imine (605 mg, 2.2 mmol) in 5 mL toluene is slowly added to a solution of Zr(CH₂Ph)₄ (500 mg, 1.1 mmol) in 50 mL toluene. The resulting dark yellow solution is stirred for 30 min. Solvent is removed under reduced pressure to yield the desired product as a reddish-brown solid.

Catalyst (A6) is bis-(1-(2-methylcyclohexyl)ethyl)(2-oxoyl-3,5-di(t-butyl)phenyl)immino) zirconium dibenzyl

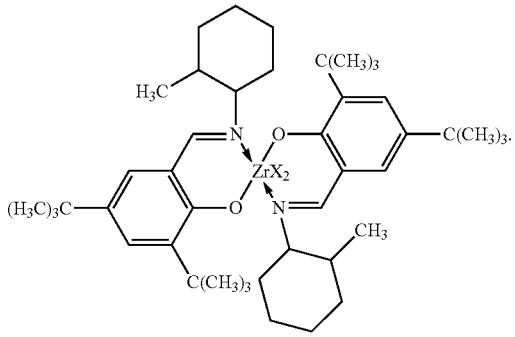

X = CH₂C₆H₅

The preparation of catalyst (A6) is conducted as follows.

a) Preparation of (1-(2-methylcyclohexyl)ethyl)(2-oxoyl-3,5-di(t-butyl)phenyl)imine 2-Methylcyclohexylamine (8.44 mL, 64.0 mmol) is dissolved in methanol (90 mL), and di-t-butylsalicaldehyde (10.00 g, 42.67 mmol) is added. The reaction mixture is stirred for three hours and then cooled to −25° C. for 12 hrs. The resulting yellow solid precipitate is collected by filtration and washed with cold methanol (2×15 mL), and then dried under reduced pressure. The yield is 11.17 g of a yellow solid. ¹H NMR is consistent with the desired product as a mixture of isomers.

b) Preparation of bis-(1-(2-methylcyclohexyl)ethyl) (2-oxoyl-3,5-di(t-butyl)phenyl) immino) Zirconium Dibenzyl A solution of (1-(2-methylcyclohexyl)ethyl)(2-oxoyl-3,5-di(t-butyl)phenyl)imine (7.63 g, 23.2 mmol) in 200 mL toluene is slowly added to a solution of Zr(CH₂Ph)₄ (5.28 g, 11.6 mmol) in 600 mL toluene. The resulting dark yellow solution is stirred for 1 hour at 25° C. The solution is diluted further with 680 mL toluene to give a solution having a concentration of 0.00783 M.

Catalyst (A7) is (t-butylamido)dimethyl(3-N-pyrrolyl-1,2,3,3a,7a-η-inden-1-yl)silanetitanium dimethyl prepared substantially according to the techniques of U.S. Pat. No. 6,268,444:

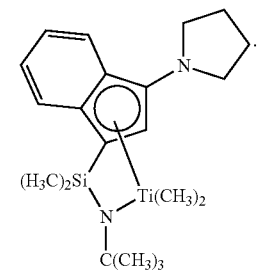

Catalyst (A8) is (t-butylamido)di(4-methylphenyl)(2-methyl-1,2,3,3a,7a-η-inden-1-yl)silanetitanium dimethyl prepared substantially according to the teachings of U.S. Patent Publication No. 2003/004286:

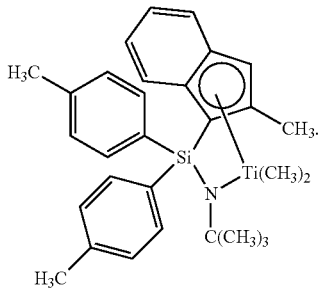

Catalyst (A9) is (t-butylamido)di(4-methylphenyl)(2-methyl-1,2,3,3a,8a-η-s-indacen-1-yl)silanetitanium dimethyl prepared substantially according to the teachings of U.S. Patent Publication No. 2003/004286:

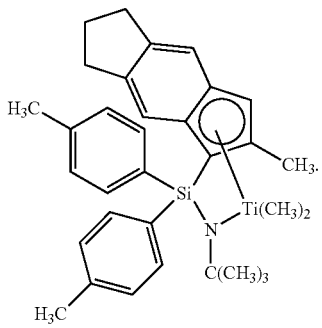

Catalyst (A10) is bis(dimethyldisiloxane)(indene-1-yl)zirconium dichloride available from Sigma-Aldrich:

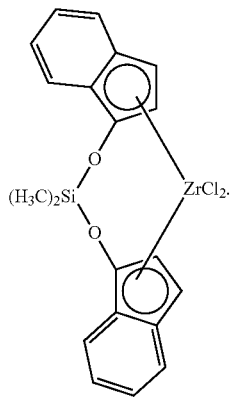

Exemplary shuttling agents that may be employed include diethylzinc, di(i-butyl)zinc, di(n-hexyl)zinc, triethylaluminum, trioctylaluminum, triethylgallium, i-butylaluminum bis(dimethyl(t-butyl)siloxane), i-butylaluminum bis(di(trimethylsilyl)amide), n-octylaluminum di(pyridine-2-methoxide), bis(n-octadecyl)i-butylaluminum, i-butylaluminum bis(di(n-pentyl)amide), n-octylaluminum bis(2,6-di-t-butylphenoxide, n-octylaluminum di(ethyl(1-naphthyl)amide), ethylaluminum bis(t-butyldimethylsiloxide), ethylaluminum di(bis(trimethylsilyl)amide), ethylaluminum bis(2,3,6,7-dibenzo-1-azacycloheptaneamide), n-octylaluminum bis(2,3,6,7-dibenzo-1-azacycloheptaneamide), n-octylaluminum bis(dimethyl(t-butyl)siloxide, ethylzinc (2,6-diphenylphenoxide), and ethylzinc (t-butoxide).

Thermoplastic Vulcanizate Composition

The thermoplastic vulcanizate (TPV) composition includes at least one thermoplastic polymer that establishes the basis of a matrix phase for the overall TPV composition in addition to the Block Interpolymer. Exemplary thermoplastic polymers include polyethylene (including branched polyethylene and polyethylene based polymers), polypropylene (including branched polypropylene and polypropylene based polymers), polycarbonate, block composites including olefin block copolymers/interpolymers (different from the block interpolymer that includes an ethylene/alpha-olefin/diene block discussed above), polystyrene, polyethylene terephthalate (including branched polyethylene terephthalate), and nylon (including branched nylon). In embodiments, the TPV composition includes at least one the thermoplastic polymer that is a thermoplastic polyolefin.

The TPV composition may include from 1 wt % to 50 wt % of at least one thermoplastic polyolefin. For example, the TPV composition may include from 10 wt % to 30 wt %, 10 wt % to 25 wt %, and/or 15 wt % to 25 wt % of the thermoplastic polyolefin (i.e., total thermoplastic polyolefin). In embodiments the thermoplastic polyolefin may be crystalline and have a high melting point above 100° C. The amount of the at least one thermoplastic polyolefin in the TPV composition is less than the amount of the rubber block interpolymer, such that the block interpolymer is present in a greater amount than the total amount of thermoplastic polyolefin (and total amount of thermoplastic polymer). The crystalline thermoplastic polyolefin is derived from an alpha-olefin monomer that has from 2 to 5 carbon atoms (i.e., a $C_2$ to $C_5$ olefin) and/or 3 or 4 carbon atoms (i.e., a $C_2$ or $C_4$ olefin). The thermoplastic polyolefin may be based on polypropylene, polyethylene, or polybutylene. For example, the thermoplastic polyolefin may be a crystalline thermoplastic polyolefin derived from propylene and/or butylene monomers. The thermoplastic polyolefin may be a polypropylene homopolymer such as isotactic polypropylene (iPP).

The amount of a sample of a block interpolymer as prepared in the manner discussed above, is greater than an amount of the thermoplastic polyolefin. The amount of the sample of the block interpolymer may be greater than 15 wt % and up to 70 wt %. For example, the amount of the sample of the block interpolymer may be from 20 wt % to 70 wt %, 25 wt % to 70 wt %, from 25 wt % to 50 wt %, from 30 wt % to 50 wt %, and/or from 32 wt % to 45 wt %, based on the total weight of the TPV composition.

The TPV composition may exclude or include minimal amounts (e.g., less than 10 wt % based on the total weight of the TPV composition) of conventional vulcanizable elastomers that are separate from the rubber block interpolymer. Vulcanizable elastomers are cross-linkable. An exemplary conventional vulcanizable elastomer includes an ethylene-propylene-diene (EPDM) polymer that has not undergone the process with respect to forming a block interpolymer.

The TPV composition includes a curative system. The curative system may account for up to 10 wt % of the total weight of the TPV composition. For example, the curative system may be present in an amount from 0.1 wt % to 10.0 wt %, 0.1 wt % to 9.0 wt %, 1.0 wt % to 8.0 wt %, 1.0 wt % to 5.0 wt %, and/or 1.0 wt % to 2.5 wt %. The curative system may include at least one catalyst and/or at least one cross-linking agent, such as any cross-linking agent that is capable of curing an elastomer and/or that assists in the curing process of the elastomer. For example, the cross-linking agent may be capable of curing an elastomer without substantially degrading and/or curing the thermoplastic polymer used in the TPV composition. For example the cross-linking agent may be selective toward curing at least one of the blocks in the block interpolymer. Exemplary cross-linking agents include peroxides, phenolic resins, azides, aldehyde-amine reaction products, vinyl silane grafted moieties, hydrosilylation, substituted ureas, substituted guanidines; substituted xanthates; substituted dithiocarbamates; sulfur-containing compounds, (such as thiazoles, imidazoles, sulfenamides, thiuramidisulfides, paraquinonedioxime, dibenzoparaquinonedioxime, and sulfur); and combinations thereof.

The TPV composition may be oil extended, e.g., may include at least one oil blended therein. For example, the oil (i.e., total oil) may account for 1 wt % to 70 wt % (e.g., 20 wt % to 70 wt %, 20 wt % to 60 wt %, and/or 25 wt % to 55 wt %) of the total weight of the TPV composition. Exemplary oils include any oil that is conventionally used in manufacturing extended EPDM rubber formulations. Examples include both naphthenic- and paraffinic-oils. For example, the oil may be a white mineral oil.

The properties of a TPV may be modified, either before or after vulcanization, e.g., by addition of ingredients that are used in the compounding of EPDM rubber, thermoplastic polymer resin, and/or blends thereof. Exemplary modifiers include particulate filler such as organic or inorganic particles (including organic or inorganic fibers, nano-sized particles, and carbon black), zeolites, amorphous precipitated or fumed silica, titanium dioxide, colored pigments, clay, talc, calcium carbonate, wollastonite, mica, montmorillonite, glass beads, hollow glass spheres, glass fibers, zinc oxide and stearic acid, stabilizers, antidegradants, flame retardants, processing aids, adhesives, tackifiers, oil extenders (including paraffinic or napthelenic oils), and other natural and synthetic polymers, plasticizers, wax, discontinuous fibers (such as wood cellulose fibers), and extender oils. Similarly, the block interpolymers may be combined with additives and adjuvants. Suitable additives include, but are not limited to, fillers, tackifiers, oil extenders (including paraffinic or napthelenic oils), and other natural and synthetic polymers. Additionally, minor amounts of a different polymer may be used as a carrier for any of the additives. An example of such a polymer would be polyethylene, for example AFFINITY® resins (The Dow Chemical Company) and EXACT® resins (ExxonMobil Chemical Company.

The TPV may be used to prepare various useful articles with known polymer processes such as extrusion (e.g., sheet extrusion and profile extrusion), injection molding, molding, rotational molding, and blow molding. Typically, extrusion is a process by which a polymer is propelled continuously along a screw through regions of high temperature and pressure where it is melted and compacted, and finally forced through a die. The extruder can be a single screw extruder, a multiple screw extruder, a disk extruder, or a ram extruder. The die can be a film die, blown film die, sheet die, pipe die, tubing die, or profile extrusion die. Injection molding is widely used for manufacturing a variety of plastic parts for various applications. Typically, injection molding is a process by which a polymer is melted and injected at high pressure into a mold, which is the inverse of the desired shape, to form parts of the desired shape and size. Molding is typically a process by which a polymer is melted and led into a mold, which is the inverse of the desired shape, to form parts of the desired shape and size. Molding can be pressure-less or pressure-assisted. Rotational molding is a process typically used for producing hollow plastic products. Rotational molding may differ from other processing methods in that the heating, melting, shaping, and cooling stages all occur after the polymer is placed in the mold, therefore no external pressure is applied during forming. Blow molding may be used for making hollow plastics containers. The process typically includes placing a softened polymer in the center of a mold, inflating the polymer against the mold walls with a blow pin, and solidifying the product by cooling. There are three general types of blow molding: extrusion blow molding, injection blow molding, and stretch blow molding.

TPV compositions may be useful for making a variety of articles such as tires, hoses, belts, gaskets, moldings, shoe soles, and molded parts. The molded part may be prepared by injection molding, extrusion blow molding, or injection blow molding. The molded part may be foamed by a chemical or physical blowing agent. The TPV composition may be useful for applications that seek high melt strength such as large part blow molding, foams, and wire cables.

Preparation of Thermoplastic Vulcanizates

Thermoplastic vulcanizates may be prepared by blending plastic and cured rubbers by dynamic vulcanization. A variety of mixing equipment may be employed to prepare a TPV by dynamic vulcanization processes. Illustrative mixing equipment include: batch mixers, such as BRABENDER® mixers, Banbury brand mixers, continuous mixers such as FARREL continuous mixers, and extruders with one or more screws such as COPERION ZSK 53. One or more such mixing equipment, including extruders, may be used in series.

At least the thermoplastic polymer, the rubber block interpolymer, and curatives may be added to a heated mixer as individual feed streams, as a dry blend, or as a masterbatch. When an extruder is used to prepare the TPV composition, if additional oil is needed, the oil is may be added from a port provided in the melt mixing device using a gear pump or the like. Additional additives or materials, including other resins and elastomers, may be added by a side feeder on the melt mixing device, or the like.

Exemplary curing temperatures for the TPV are well-known to one skilled in the art. Exemplary curing temperatures may depend on the thermoplastic polymer and vulcanizing agent and/or activator. The curing temperatures may the range from 80° C. to 300° C. For example, when a polypropylene homopolymer is used as the thermoplastic polymer and the curative is a phenolic resin, a curing temperature of 170° C. to 270° C. and/or 190° C. to 250° C. may be used. Heating and masticating at these vulcanization temperatures may be adequate to complete the vulcanization reaction in a few minutes or less, but if shorter vulcanization times are desired, higher temperatures may be used. The desired dispersion of discrete crosslinked rubber particles (in this case rubber block interpolymers) and end properties may be achieved through choice of screw design and screw speed. The progress of the vulcanization may be followed by monitoring melt temperature or mixing energy or mixing torque requirement during the process. If desired, one can add additional ingredients, such as a stabilizer package, processing aid, oil, plasticizer, and/or additional thermoplastic polymer after the dynamic vulcanization is complete.

In some embodiments, the TPV is made using a one step or two or more step compounding process. For example, in one-step compounding using phenolic curatives, the compounding temperature may be maintained below 220° C., e.g., to avoid breaking down the phenolic curative agent. In two-step compounding, when the vulcanizing agent does not require a cure activator, the TPV premix will not contain any vulcanizing agent. If the vulcanizing agent requires a cure activator, the cure activator can be added to the TPV premix and the curative agent may be added during the second step and the temperature during the second step may be maintained below 220° C.

After discharge from the mixing device, the TPV may be milled, chopped, extruded, pelletized, injection molded, or processed by any other desirable technique.

Unless stated to the contrary, implicit from the context, or customary in the art, all parts and percents are based on weight and all test methods are current as of the filing date of this disclosure. All molecular weight numbers are based on number average molecular weight, unless indicated otherwise. The numerical ranges in this disclosure are approximate.

Examples

Characterization Methods

Exemplary characterization (test) methods with respect to block interpolymers and the preparation methods thereof are discussed in U.S. Pat. No. 8,569,422. Exemplary characterization methods with respect thermoplastic vulcanizates and the preparation methods thereof are discussed in U.S. Pat. No. 8,476,366.

Differential Scanning calorimetry (DSC) is used to measure crystallinity in the polymers (e.g., ethylene-based (PE) polymers). About 5 to 8 mg of polymer sample is weighed and placed in a DSC pan. The lid is crimped on the pan to ensure a closed atmosphere. The sample pan is placed in a DSC cell, and then heated, at a rate of approximately 10° C./min, to a temperature of 180° C. for PE (230° C. for polypropylene or "PP"). The sample is kept at this temperature for three minutes. Then the sample is cooled at a rate of 10° C./min to −90° C. for PE (−40° C. for PP), and kept isothermally at that temperature for three minutes. The sample is next heated at a rate of 10° C./min, until complete melting (second heat). The percent crystallinity is calculated by dividing the heat of fusion ($H_f$), determined from the second heat curve, by a theoretical heat of fusion of 292 J/g for PE (165 J/g, for PP), and multiplying this quantity by 100 (for example, % cryst.=($H_f$/292 J/g)×100 (for PE)). Unless otherwise stated, melting point(s) ($T_m$) of each polymer is determined the heat curve (peak Tm). The enthalpy is calculated with respect to a linear baseline drawn from the beginning to the end of the melting peak; typical beginning temperatures for polyolefin rubber is −35° C.

$^{13}C$ NMR Analysis for determining the characteristics of the block interpolymer is performed by preparing samples by adding approximately 3 g of a 50/50 mixture of tetrachloroethane-$d^2$/orthodichlorobenzene to 0.4 g sample in a 10 mm NMR tube. The samples are dissolved and homogenized by heating the tube and its contents to 150° C. The data is collected using a JEOL Eclipse™ 400 MHz spectrometer or a Varian Unity Plus™ 400 MHz spectrometer, corresponding to a $^{13}C$ resonance frequency of 100.5 MHz. The data is acquired using 4000 transients per data file with a 6 second pulse repetition delay. To achieve minimum signal-to-noise for quantitative analysis, multiple data files are added together. The spectral width is 25,000 Hz with a minimum file size of 32K data points. The samples are analyzed at 130° C. in a 10 mm broad band probe. The comonomer incorporation is determined using Randall's triad method (Randall, J. C.; JMS-Rev. Macromol. Chem. Phys., C29, 201-317 (1989), which is incorporated by reference herein in its entirety.

Shore A Hardness is determined using ASTM D2240. In particular, measurements are taken with a Shore A type durometer. The durometer is placed onto a plaque of approximately 3 mm thickness.

Tensile Properties are determined using ASTM D1708. In particular, 100% modulus (MPa), tensile strength at break (%), and elongation at break (%) are measured according to ASTM D1708.

Compression Set is determined using ASTM D395 at (1) 25% strain based on 22 hours at 70° C., and (2) 25% strain based on 70 hours at 120° C. Compression set is a measure of the degree of recovery of a sample following compression and is calculated according to the equation CS=(H0−H2)/(H0−H1), where H0 is the original thickness of the sample, H1 is the thickness of the spacer bar used, and H2 is the final thickness of the sample after removal of the compressive force.

Tear Strength is determined using ASTM D624.

Preparation of Block Interpolymer

The Block Interpolymer is produced using a catalyst fed simultaneously into both reactors. The soft block is produced in the first reactor and the low crystallinity hard block is produced in the second reactor. The split between soft and hard block is 40/60. Fresh ENB was slowly added in 0.1 lb/hr increments into the solvent stream being fed into the second reactor until a level of 0.4 wt % was incorporated into the polymer. The ENB is incorporated into the amorphous, soft block.

The Block Interpolymer is prepared in two loop reactors connected and series and configured to run at 525 psi. Two port injectors are used to feed the Catalyst, Cocatalyst-1, Cocatalyst-2, and SA (shuttling agent)-1, separately into the reactors. For preparation of the Block Interpolymer, the Catalyst is ([[rel-2',2'''-R1R,2R)-1,2-cylcohexanediylbis(methyleneoxy-κO)]bis[3-(9H-carbazol-9-yl)-5-methyl[1,1'-biphenyl]-2-olato-κO]](2-)]dimethyl-hafnium). The Cocatalyst-1 is a mixture of methyldi($C_{14-18}$alkyl)ammonium salts of tetrakis(pentafluorophenyl)borate, prepared by reaction of a long chain trialkylamine (Armeen™ M2HT, available from Akzo-Nobel, Inc.) are used. The Cocatalyst-2 is mixed $C_{14-18}$ alkyldimethylammonium salt of bis(tris(pentafluorophenyl)-alumane)-2-undecylimidazolide, prepared according to U.S. Pat. No. 6,395,671, Ex. 16. The SA-1 is diethylzinc (DEZ).

The Block Interpolymer is produced in a low-pressure, solution polymerization loop reactor, made up of a 3 inch (76 mm) loop pipe plus two heat exchanges, the total volume of which is 31.4 gallons (118.9 liter). Solvent and monomer (ethylene) are injected into the reactor as a liquid. The comonomers (propylene and diene) gas is fully dissolved in the liquid solvent. The feed is cooled to 5° C. before injection into the reactor. The solvent used is a high purity iso-paraffinic fraction available from Exxon under the trademark ISOPAR™ E (available from ExxonMobil Chemical).

Fresh propylene is passed through a bed of Selexsorb® COS (available from BASF) for purification before mixing with a recycle stream containing solvent, propylene, ethylene, and hydrogen. After mixing with the recycle stream, the combined stream is passed through a bed of 75 wt % Molecular Sieve 13X and 25 wt % Selexsorb® CD (available from BASF) for further purification before using a high pressure 700 psig (4826 kPa) feed pump to pass the contents to the reactor. Fresh ethylene is passed through a Selexsorb® COS bed for purification before compressing the stream to 750 psig (5171 kPa). Hydrogen (a telogen used to reduce molecular weight) is mixed with the compressed ethylene before the two are mixed/dissolved into the liquid feed. The total stream is cooled to an appropriate feed temperature (5° C.). The reactor operates at 500-525 psig (3447-3619 kPa) and the control temperature.

Upon exiting the reactor, water and additive are injected into the polymer solution. The water hydrolyzes the catalyst, terminating the polymerization reaction. The additives include the antioxidant (e.g., Irganox® 1010 and Irganox® 1076, both available from BASF Corporation, in the amounts up to 1500 ppm). The post-reactor solution is super-heated from reactor temperature to 230° C. in preparation for a two-stage devolatilization. The solvent and unreacted monomers are removed during the devolatilization process. The polymer melt is pumped to a die for underwater pellet cutting. Solvent and monomer vapors exiting the top of the devolatilizers are sent to a coalescer. The coalescer removes polymer entrained in the vapor during devolatilization. The clean vapor stream leaving the coalescer is partially condensed through a series of heat exchangers. The two-phase mixture enters a separation drum. The condensed solvent and monomers are purified (this is the recycle stream described above) and re-used in the reaction process. The vapors leaving the separating drum, mostly containing propylene and ethylene are sent to a block flare and burned.

The process conditions for producing the Block Interpolymer are as follows:

TABLE 1-continued

| Condition | 1st Reactor | 2nd reactor |
|---|---|---|
| Catalyst Flow (lb/hr) | 0.71 | 1.50 |
| Catalyst Conc. (ppm) | 450 | 450 |
| Cocatalyst-1 Flow (lb/hr) | 0.61 | 1.29 |
| Cocatalyst-1 Conc. (ppm) | 7000 | 7000 |
| Cocatalyst-2 Flow (lb/hr) | 0.39 | — |
| Cocatalyst-2 Conc. (ppm) | 3594 | — |
| SA1 Flow (lb/hr)[2] | 0.729 | — |
| SA1 Concentration (ppm) | 30000 | — |
| Percent Ethylene Conversion (%) | 90.4 | 88.9 |
| Production Rate (lb/hr) | 37.1 | 57.9 |

[1] Standard cm$^3$/min.
[2] The SA1 includes DEZ and 1-3 mol % of MMAO.

The DSC melting point temperature profile of the resultant Block Interpolymer is shown in FIG. 1.

The characteristics of the Block Interpolymer are shown in Table 2, below

TABLE 2

| | Mooney Viscosity | Mw Kg/mol | Mw/Mn | Total $C_2$ (wt %) | Total ENB (wt %) | Tm (° C.)[1] | Tc (° C.) | Tg (° C.)[1] | Melt Enthalpy (J/g)[1] |
|---|---|---|---|---|---|---|---|---|---|
| Block Interpolymer | 43 | 134 | 2.43 | 62.5 | 0.4 | 12.9 | 3.9 | −35.0 | 18.6 |

[1] The DSC Heating Curve is shown in FIG. 1.

The composition of the Block Interpolymer is shown in Table 3, below. In particular, the total wt % $C_2$ added to the Block Interpolymer from the 1$^{st}$ Reactor and the total wt % $C_2$ added to the Block Interpolymer from the 2$^{st}$ Reactor, based on the total weight of the sample of the Block Interpolymer collected leaving the individual reactors, are shown in Table 3. Whereas, an overall total $C_2$ content of the Block Interpolymer is shown in Table 2, above. Further, wt % of ENB in the Block Interpolymer from the 1$^{st}$ Reactor and wt % ENB in the Block Interpolymer from the 2$^{st}$ Reactor, based on the total weight of the sample of the Block Interpolymer collected leaving the individual reactors, are shown in Table 3. Further, the percentage of the total weight of the Block Interpolymer made in the 1$^{st}$ reactor and the total weight of the Block Interpolymer made in the 2$^{nd}$ reactor (with a total of 100 wt %), are shown in Table 3.

TABLE 3

| | wt % $C_2$ in Interpolymer from 1$^{st}$ Reactor | wt % $C_2$ in Interpolymer from 2$^{nd}$ Reactor | wt % ENB in Interpolymer from 1$^{st}$ Reactor | wt % ENB in Interpolymer from 2$^{nd}$ Reactor | wt % of Interpolymer made in 1$^{st}$ Reactor | wt % of Interpolymer made in 2$^{nd}$ Reactor |
|---|---|---|---|---|---|---|
| Block Interpolymer | 70.8 | 50.0 | 0 | 0.4 | 40 | 60 |

Preparation of Thermoplastic Vulcanizates

The materials principally used are as follows:

EPDM Blend A mixed (non-reactor) blend of EPDM including:

(1) 60 wt % of NORDEL™ IP 3745P, an ethylene-propylene-diene having an ethylene content of 71 mass % as measured according to ASTM 3900, a diene of ethylidene norbornene content of 0.5 mass % as measured according to ASTM D6047, a remainder of propylene, and a Mooney Viscosity at

TABLE 1

| Condition | 1st Reactor | 2nd reactor |
|---|---|---|
| Reactor Control Temp. (° C.) | 105 | 125 |
| Solvent Feed (lb/hr) | 245.75 | 296.23 |
| Ethylene Feed (lb/hr) | 18.94 | 42.67 |
| Propylene Feed (lb/hr) | 37.18 | 2.96 |
| ENB Feed (lb/hr) | 0 | 1.56 |
| Reactor Propylene Conc. (g/L) | 95.22 | 23.57 |
| Hydrogen Feed (sccm)[1] | 0 | 0 |

125° C. of 45 according to ASTM D1646 (available from The Dow Chemical Company); and (2) 40 wt % of NORDEL™ 3430, an ethylene-propylene-diene having an ethylene content of 42 mass % as measured according to ASTM 3900, a diene of ethylidene norbornene content of 0.7 mass % as measured according to ASTM D6047, and a Mooney Viscosity at 125° C. of 27 according to ASTM D1646 (available from The Dow Chemical Company).

Figure 2A:
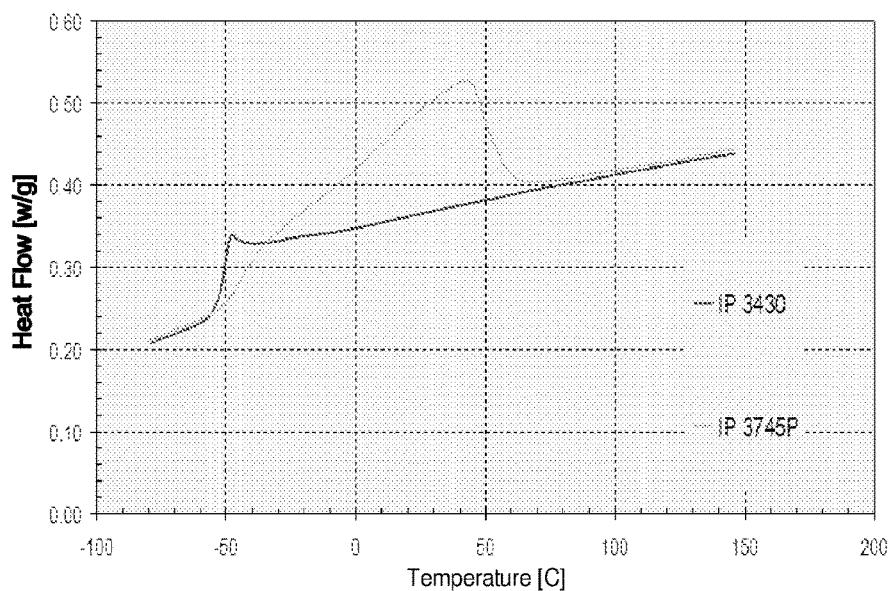
FIGS. 2A and 2B illustrate DSC melting point temperature profiles of the EPDMs used in Comparative Examples A and B, as is shown the DSC melting point temperature profiles for the individual EPDMs are different from the DSC melting temperature profile for the Block Interpolymer.
Figure 2B:
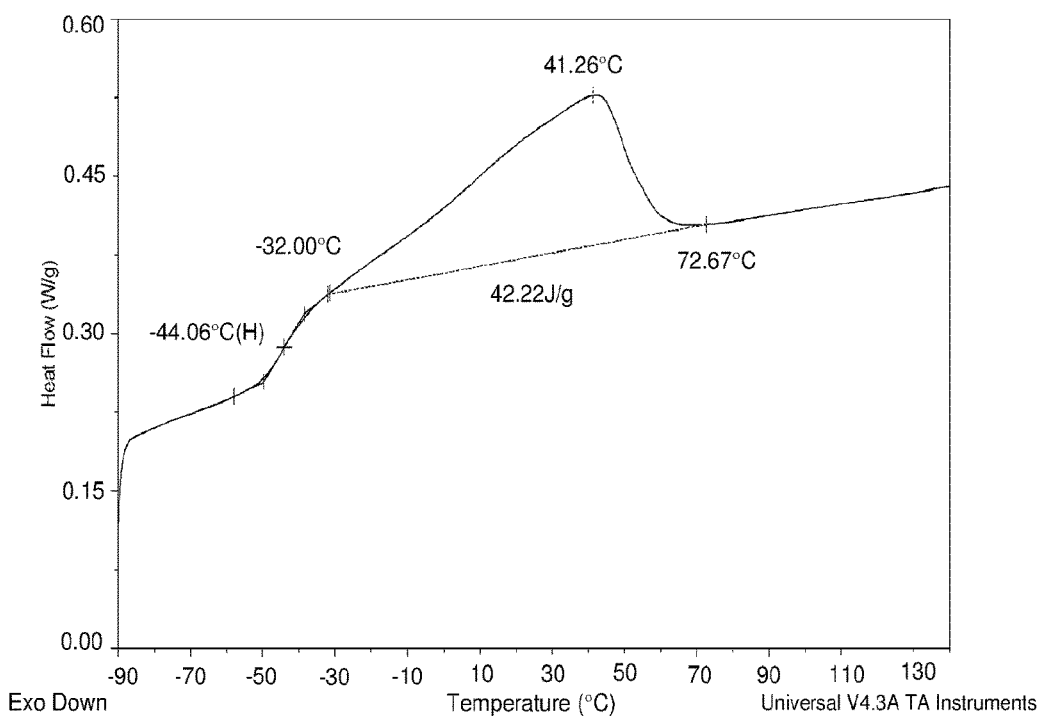

A DSC melting point temperature profile of each of NORDEL™ IP 3745P and NORDEL™ 3430 is shown in FIG. 2.

Thermoplastic Polyolefin A polypropylene homopolymer having a melt flow rate of 0.5 g/10 min as measured according to ASTM D1238 (available as Pro-fax 6823 from LyondellBasell).

Oil A white mineral oil (available as Hydrobrite® 550 PO from Sonneborn).

DCP Dicumyl peroxide, as part of a curative system (available from Sigma-Aldrich®).

TAC Tri-allyl cyanurate, as part of a curative system (available from Sigma-Aldrich®).

Antioxidant A stabilizer system (available as Irganox® B 225 from BASF Corporation).

Working Examples 1 and 2 and Comparative Examples A and B are prepared according to the approximate formulations below:

TABLE 4

| | Working Example 1 (wt %) | Working Example 2 (wt %) | Comparative Example A (wt %) | Comparative Example B (wt %) |
|---|---|---|---|---|
| Block Interpolymer | 43.2 | 35.0 | — | — |
| EPDM Blend | — | — | 43.2 | 35.0 |
| Thermoplastic Polyolefin | 21.6 | 17.5 | 21.6 | 17.5 |
| Oil | 32.6 | 45.4 | 32.6 | 45.4 |
| DCP | 1.3 | 1.1 | 1.3 | 1.1 |
| TAC | 0.9 | 0.7 | 0.9 | 0.7 |
| Antioxidant | 0.4 | 0.3 | 0.4 | 0.3 |

With reference to Table 4, the amount of Oil is increased in Working Example 2 and Comparative Example B, in relation to Working Example 1 and Comparative Example A.

The preparation process for the TPV formulations of Working Examples 1 and 2 and Comparative Examples A and B, according to the formulations in Table 4, is as follows:

(1) The elastomer pellets are imbibed in paraffinic oil in a glass jar at 50° C. for 24 hours to minimize slippage and to reduce mixing time.

(2) A Haake mixer bowl is heated to 190° C.

(3) The mixer is started at 35 rpm.

(4) The oil-imbibed elastomer and the Thermoplastic Polyolefin (Profax 6823, a 0.5 MFR, polypropylene homopolymer available from Lyondell Basell) are added to the mixer.

(5) The materials are mixed for 4 minutes at 75 rpm.

(6) The cure package (TAC followed by DCP) are added to the molten mixture, and mixing is allowed to continue for 3 more minutes.

(7) The Antioxidant is added, and mixing is allowed to continue for one more minute.

(8) The melt is removed from the internal mixer and allowed to further mix on a 2-roll mill at 190° C. The melt is passed through the mixer and the resulting sheet is rolled into a cigar-shaped specimen before being placed end-wise in to and passed through the mill. The procedure is repeated 6 times and then the sample is taken off the mill as a sheet.

(9) The sheet from the mill is preheated in a heated press (190° C.) for two minutes under 2000 psi of pressure. Then, the sheet is compression molded at 190° C. under 55000 psi of pressure for 4 minutes and cooled for 4 minutes with 55000 psi of pressure. This procedure produces test plaques with from 1/16 inch to 1/8 inch thickness.

Referring to Table 5, below, the Shore A hardness, tensile properties, compression set, and tear strength are measured for samples of each of Examples 1 and 2 and Comparative Examples A and B.

TABLE 5

| | Working Example 1 | Working Example 2 | Comparative Example A | Comparative Example B |
|---|---|---|---|---|
| Shore A Hardness | 59 | 45 | 59 | 46 |
| 100% Modulus (MPa) | 2.0 | 1.1 | 1.9 | 1.2 |
| Tensile Strength at Break (%) | 4.0 | 2.5 | 2.9 | 2.0 |
| Elongation at Break (%) | 375 | 423 | 290 | 320 |
| Compression Set of 25 @ for 22 hours at 70° C. (%) | 50 | 56 | 68 | 62 |
| Tear Strength (lbf/in) | 150 | 102 | 115 | 86 |

The Shore A hardness and 100% modulus are comparable for Working Example 1 and Comparative Example A, as well as for Working Example 2 and Comparative Example B. Further, at a similar Shore A hardness and 100% modulus, a significant improvement is seen for Working Examples 1 and 2 with respect to compression set (which indicates better elastic recovery), tensile strength, elongation at break, and tear strength, in comparison to Comparative Examples A and B, respectively.

Figure 3:
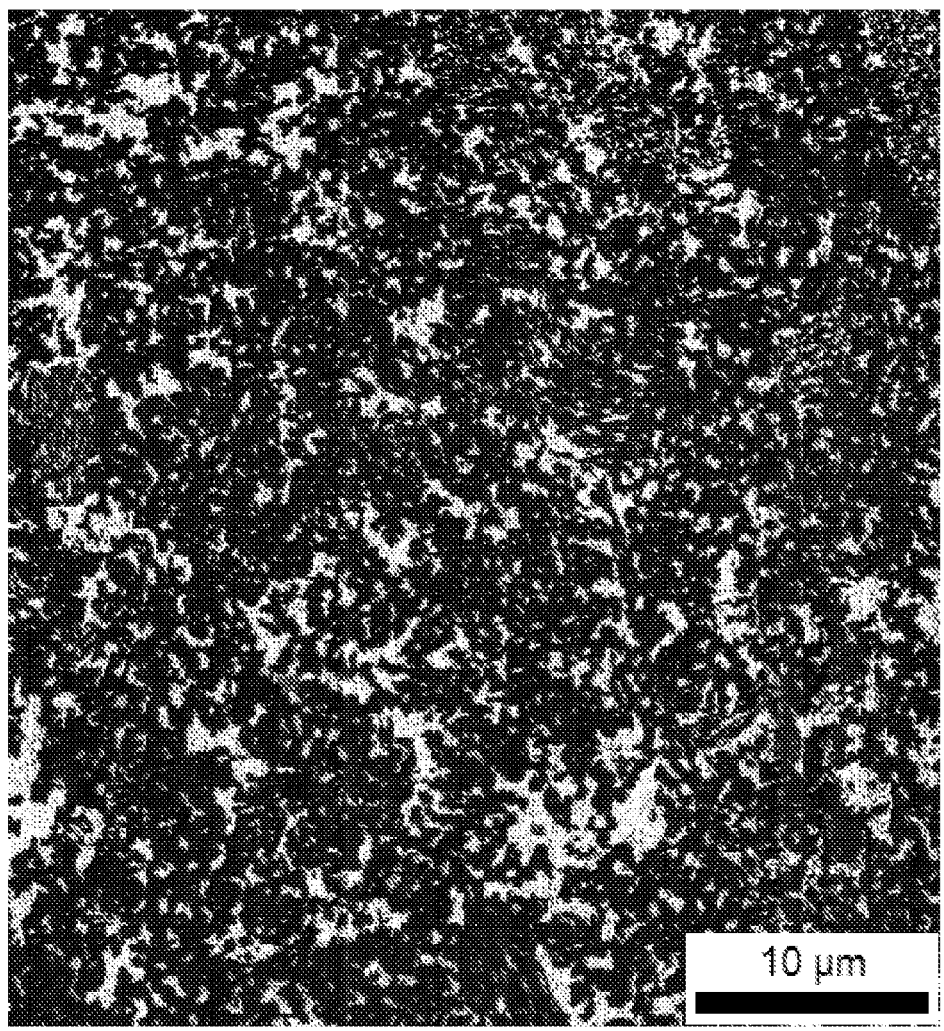
FIG. 3 illustrates a TEM Micrograph of Working Example 1, at a scale of 10 µm.
Figure 4:
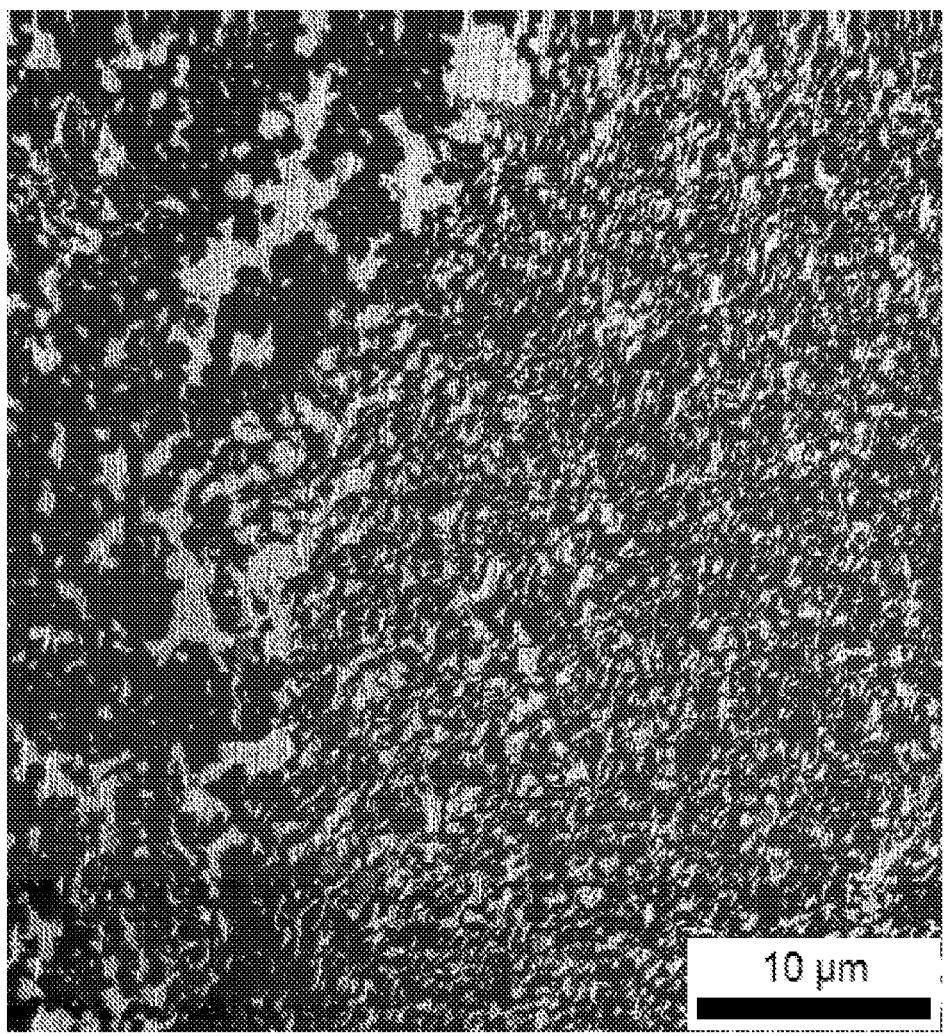
FIG. 4 illustrates a TEM Micrograph of Comparative Example A, at a scale of 10 µm.

A TEM Micrograph for Working Example 1 is shown in FIG. 3 and a TEM Micrograph for Comparative Example A is shown in FIG. 4. A good blending of the components, at a scale of 10 μm, is seen with respect to Working Example 1. However, for Comparative Example A it is clear that two different morphologies are present in the material.

Figure 5A:
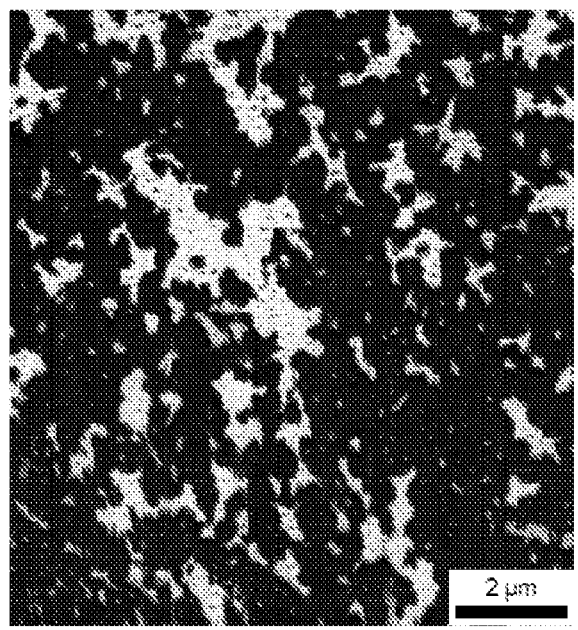
FIGS. 5A and 5B illustrate TEM Micrographs of the left and right side portions, respectively, of the TEM of Working Example 1, at a scale of 2 µm.
Figure 5B:
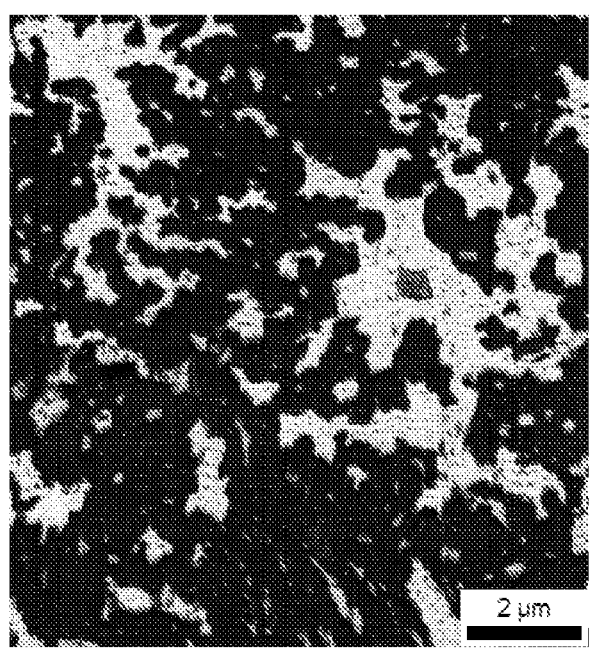
Figure 6A:
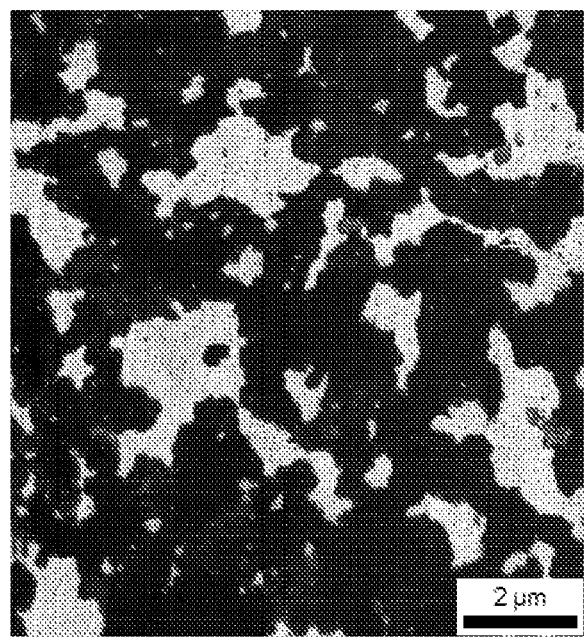
FIGS. 6A and 6B illustrate TEM Micrographs of the left and right side portions, respectively, of the TEM of Comparative Example A, at a scale of 2 µm.
Figure 6B:
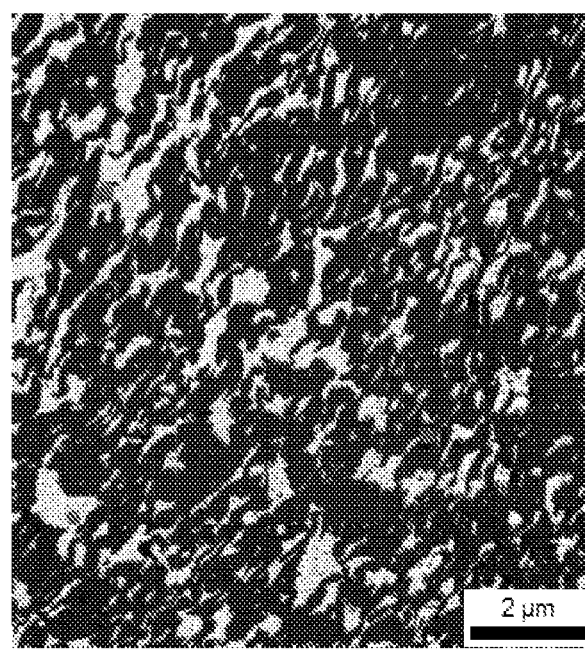

TEM Micrographs, at a scale of 2 μm, for the different magnified portions (i.e., left and right side portions) of the TEM sample for Working Example 1 are shown in FIGS. 5A and 5B. TEM Micrographs, at a scale of 2 μm, for the different magnified portions (i.e., left and right side portions) of the TEM sample for Comparative Example A are shown in FIGS. 6A and 6B. Referring to the figures, it is clear that Working Example 1 demonstrates a more uniform morphology compared to Comparative Example A. Accordingly, it can be said that Working Example 1 demonstrates a uniform morphology across a sample at scales as low as 10 μm, which is not seen for Comparative Example A.

What is claimed is:

1. A thermoplastic vulcanizate composition, comprising:
    (a) a crystalline thermoplastic polyolefin comprising alpha-olefin monomers having from 2 to 5 carbon atoms;
    (b) a rubber block interpolymer comprising a first block and a second block having differing chemical or physical properties from the first block, the first block being derived from ethylene, a first alpha-olefin monomer having from 3 to 10 carbon atoms, and a first diene monomer having from 2 to 25 carbon atoms, the second block being derived from ethylene, a second alpha-olefin monomer having from 3 to 10 carbon atoms, and optionally a second diene monomer having from 2 to 25 carbon atoms, and an amount of the block interpolymer in the composition being greater than an amount of the thermoplastic polyolefin in the composition; and (c) a curative system, wherein the rubber block interpolymer comprises a density from 0.860 to 0.925 g/cm$^3$ and a DSC melting point temperature of greater than −35° C. and less than 78° C.

2. The thermoplastic vulcanizate composition as claimed in claim 1, wherein the rubber block interpolymer is an asymmetrical block interpolymer in which the first block is an ethylene/alpha-olefin/diene block and the second block is an ethylene/alpha-olefin block that excludes the diene.

3. The thermoplastic vulcanizate composition as claimed in claim 1, wherein the rubber block interpolymer in which the first block is an ethylene/alpha-olefin/diene block and the second block is an ethylene/alpha-olefin/diene block.

4. The thermoplastic vulcanizate composition as claimed in claim 1, wherein an amount of the block interpolymer is greater than 15 wt % and up to 70 wt %, based on the total weight of the thermoplastic vulcanizate composition.

5. The thermoplastic vulcanizate composition as claimed in claim 1, further comprising an oil.

6. The thermoplastic vulcanizate composition as claimed in claim 5, wherein an amount of the block interpolymer is from 20 wt % to 70 wt %, an amount of the thermoplastic polyolefin is from 1 wt % to 50 wt %, an amount of the oil is from 1 wt % to 70 wt %, and an amount of the curative system is from 0.1 wt % to 10.0 wt %, based on the total weight of the thermoplastic vulcanizate composition.

7. The thermoplastic vulcanizate composition as claimed in claim 6, wherein an amount of the block interpolymer is from 25 wt % to 50 wt %, an amount of the thermoplastic polyolefin is from 10 wt % to 30 wt %, an amount of the oil is from 20 wt % to 70 wt %, and an amount of the curative system is from 0.1 wt % to 10.0 wt %, based on the total weight of the thermoplastic vulcanizate composition.

8. The thermoplastic vulcanizate composition as claimed in claim 1, wherein the first alpha-olefin is the same as the second alpha-olefin and the first diene is the same as the second diene, if included.

9. The thermoplastic vulcanizate composition as claimed in claim 1, wherein the first block is an ethylene-propylene-diene rubber and the second block is an ethylene-propylene polymer.

10. The thermoplastic vulcanizate composition as claimed in claim 1, wherein the thermoplastic polyolefin is a polymer having isotactic propylene as a continuous phase with a rubber phase dispersed therein, the rubber phase consisting of the rubber block interpolymer.

* * * * *